Sept. 19, 1961   J. H. MELZER   3,000,088
METHOD OF MAKING HOLLOW RIGID SHEET METAL STRUCTURE
Filed May 13, 1957   3 Sheets-Sheet 1
Fig. 1
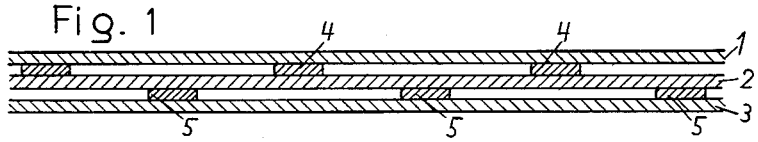
Fig. 2
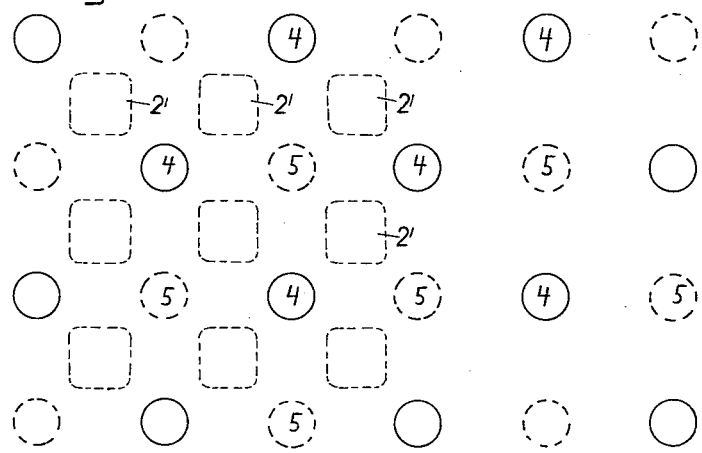
Fig. 3
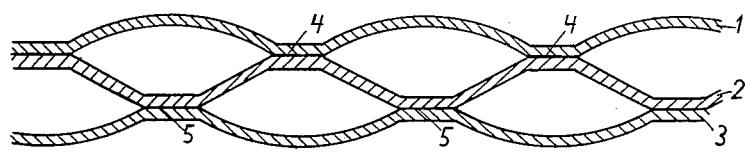
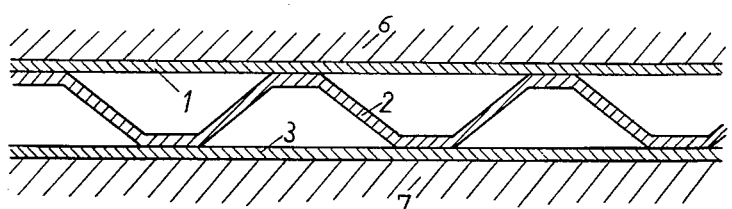
Fig. 4
INVENTOR Sept. 19, 1961  J. H. MELZER  3,000,088
METHOD OF MAKING HOLLOW RIGID SHEET METAL STRUCTURE
Filed May 13, 1957  3 Sheets-Sheet 2

INVENTOR

Sept. 19, 1961  J. H. MELZER  3,000,088
METHOD OF MAKING HOLLOW RIGID SHEET METAL STRUCTURE
Filed May 13, 1957  3 Sheets-Sheet 3

INVENTOR

United States Patent Office 3,000,088
Patented Sept. 19, 1961

3,000,088
METHOD OF MAKING HOLLOW RIGID SHEET METAL STRUCTURE
Jean H. Melzer, Vogler-Str. 36, Weinheim an der Bergstrasse, Germany
Filed May 13, 1957, Ser. No. 658,709
Claims priority, application Germany May 17, 1956
4 Claims. (Cl. 29—421)

My invention relates to a method of making hollow rigid sheet metal structures generally of the honeycomb or webbed type, and has for its object to devise sheet metal products, applicable for the construction of floors, walls, roofs, partitions, bulkheads and other large-area structures, which combine light weight and great rigidity and strength with the advantages of being more readily and more cheaply producible than the honeycomb and similar sheet metal structures heretofore available.

According to my invention, I form a hollow rigid sheet metal structure from at least three metal sheets. Two of the sheets form the exterior large-area covers of the structure and are spaced from each other in parallel relation a distance which is a great multiple of the sheet thickness. The third sheet is located between, and permanently joined with, the two cover sheets and is perforated in accordance with a regular area pattern of cutouts which form strips of sheet material between them. The inner sheet, hereinafter briefly called "lattice sheet," is deformed to a three-dimensional structure so that the just-mentioned strips form a multitude of struts, each extending from a junction point at one cover sheet in a slanting or curved direction to a junction point at the other cover sheet. The junctions preferably consist of spot welds and are located at spots which are distributed over the sheet area in a regular pattern so that the welds or junction spots of one cover sheet are interspersed between those of the other cover sheet.

According to another feature of the invention, the edges of the three sheets are joined together in face-to-face or sandwich relation on at least two opposite sides, or on all four sides, of the sheet metal structure so as to form a marginal portion of much smaller thickness than that of the bulk of the composite structure, such margins being available for joining the structure to another structure of the same kind, or to any other structural part, by welding, riveting or any other suitable fastening method.

According to another feature of my invention, the above-described sheet metal structure is made as follows. First the three sheets, all being still flat, are so stacked upon each other that the lattice sheet is sandwiched between the two cover sheets. Then the three planar sheets are welded together at spots forming two mutually interspersed area patterns, each pattern of welded spots joining the lattice sheet with one of the two respective cover sheets. Thereafter, the edges of the flat sandwich assembly are closed or sealed with the exception of one or more locations where an inlet for pressure fluid is left open; and the sandwich is then inflated by applying gas pressure or hydraulic pressure through the inlet. As a result, the structure is expanded to the desired final thickness, and the lattice sheet becomes permanently deformed to three-dimensional shape so that the material between the perforations forms the above-mentioned spacer structure of struts between the two cover sheets.

If the cover sheets are supposed to remain planar, the above-described expansion process is carried out while the sheet metal assembly is located within a confined space with plane walls located adjacent to the cover sheets. For this purpose, the welded sandwich is preferably inserted between the pressure surfaces of a table press. The edges of the sandwich are then clamped shut by a frame-shaped pressure member. While, thereafter, the fluid pressure is applied to the interior of the stack, the pressure tables of the press recede gradually from each other in accordance with the rising pressure within the sheet assembly, so that the surfaces of the cover sheets remain flat and planar during the entire process until the cover sheets arrive at the final location corresponding to the desired shape and width of the hollow structure in which the inner sheet is now deformed into a multitude of angular struts or webs.

To facilitate the proper deformation of the strut system, the lattice sheet is preferably so perforated by punching that all superfluous material is removed and only the desired strut or web system is retained. The remaining material which is to be deformed into the strut members during subsequent inflation of the structure is preferably cut along curved lines so that the curved length of each individual strut member within the still planar sheet is approximately equal to the final straight length which this member is to reach during the deformation process.

The foregoing and more specific objects, advantages and features of my invention will be apparent from the embodiments described hereinafter with reference to the drawings, in which—

FIG. 1 shows schematically a sandwich of three metal sheets spot-welded in pairs.

FIG. 2 shows the spot-welding pattern applicable to the same sandwich assembly.

FIG. 3 illustrates a cross section of the stack after inflation.

FIG. 4 shows schematically a cross section of a sheet metal structure resulting from expanding the same stack between yielding retaining surfaces of a table press.

Figure 5:
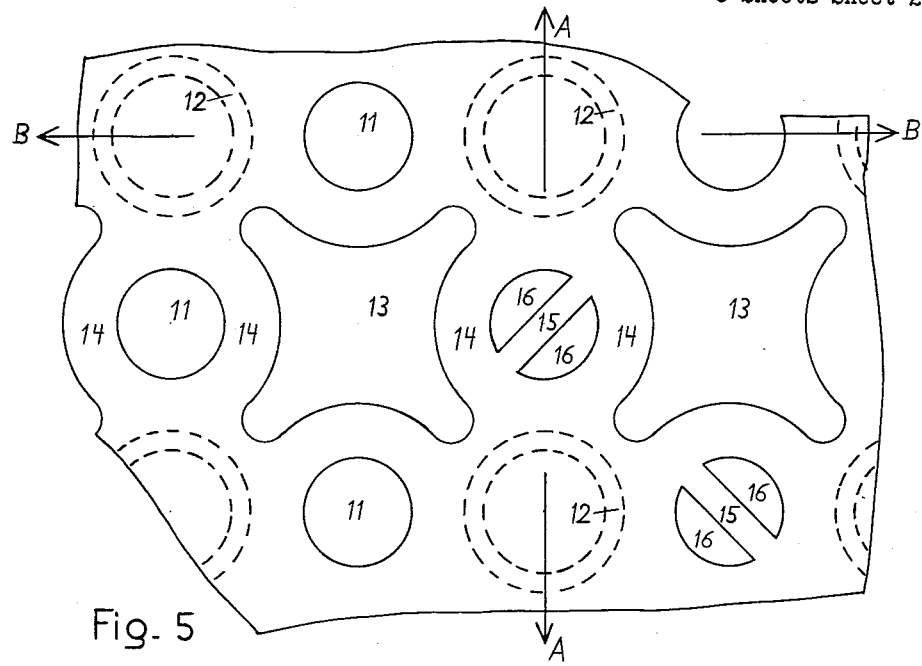
FIG. 5 shows in detail a portion of the lattice sheet still in planar shape.

A manufacturing example for the production of a hollow metal structure of steel will now be described with reference to FIGS. 1 and 2.

According to the schematic illustration in FIG. 1, three flat metal sheets, which may have the same thickness and may consist of the same material, are first placed on top of each other to form a sandwich assembly. The cover sheets 1 and 3 are continuous, i.e. imperforate. The intermediate sheet 2 is provided with a pattern of perforations so as to form a grille or lattice. The perforations are preferably produced by punching. In FIG. 2, such a pattern of perforations or cut-outs is shown by broken lines denoted by 2'. While the cut-outs shown in FIG. 2 have generally square shape with rounded corners, the cut-outs may also be circular or of other curved shapes. A preferred pattern of cut-outs in the lattice sheet 2 is described below with reference to FIG. 5.

After stacking the three sheets, the cover sheet 1 is welded together with the lattice sheet 2 at a number of regularly distributed spots 4, and the cover sheet 3 is welded together with the lattice sheet 2 at a number of other spots 5 which are likewise regularly distributed over the entire area to form a pattern in interspersed relation to the pattern of spots 4 as is apparent from FIG. 2.

The welding is preferably done by means of electric welding, using two concentric welding electrodes placed from the outside against the surface of one cover sheet to be welded. If necessary, an insulating medium such as paper or varnish may be placed into the sandwich assembly beneath each welding junction in order to prevent the weld from penetrating through the entire stack and thus welding not only the electrode-adjacent cover sheet but also the opposite cover sheet to the lattice sheet. However, I have found that when using concentric welding electrodes for spot-welding according to the commercially available method, the welding depth can be reliably controlled so that the weld does not penetrate through the lattice sheet even if no protective insulation is used. The welding process can be carried out with multiple welding machines by passing the sandwich assembly once or twice through such a machine.

After completion of the spot-welding operations, the welded sandwich is sealed along the edges. Thereafter, fluid pressure is applied, preferably by forcing hydraulic liquid, such as oil, into the interior of the sandwich. As a result, the sandwich structure is inflated and tends to assume the expanded shape illustrated in FIG. 3. The cover sheets 1 and 3 tend to become buckled which is desirable or not objectionable for certain purposes. However, in cases where the exterior surfaces of the resulting hollow structure are to remain plane, the inflation must be effected while the cover sheets 1 and 3 are being kept in abutment with rigid and plane surfaces as is schematically illustrated in FIG. 4, showing the use of two abutment structures 6 and 7 which cause the expanded sheet metal structure to remain plane.

Figure 6:
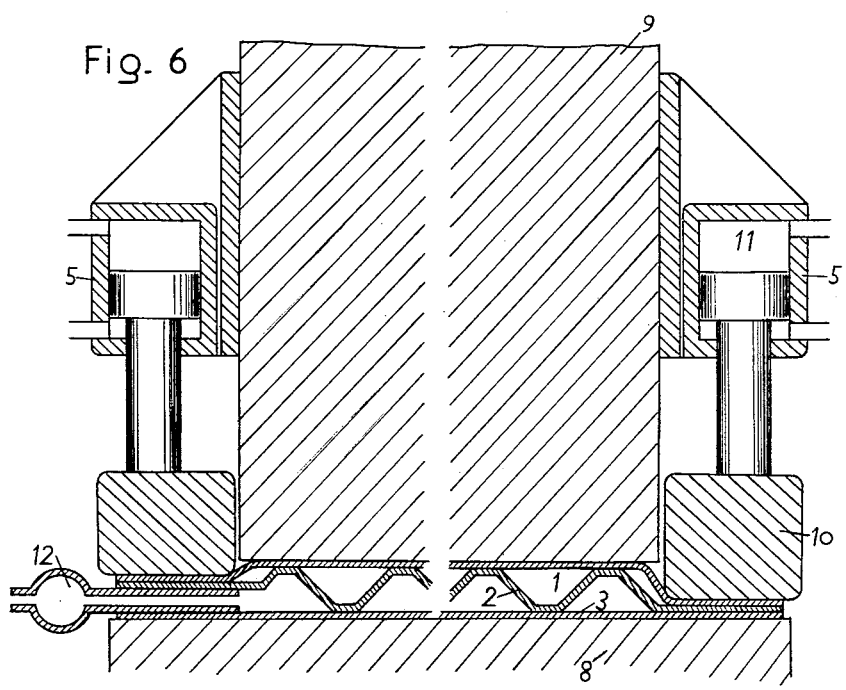
FIG. 6 shows schematically and in cross section a table press with a stack of welded sheets being processed.

The just-mentioned inflating process is preferably carried out with the aid of a table press as shown in FIG. 6. The table press has a bottom table 8 and a top table formed by a pressure plunger 9. The press is further provided with a frame-shaped pressure member 10 which extends around the upper table member 9 and is operated by means of a ring-shaped hydraulic piston-and-cylinder system 11.

When starting the operation, both pressure members 9 and 10 are lifted so that the sandwich structure can be placed upon the press table 8. Thereafter, the frame-shaped pressure member is lowered in order to firmly compress and seal the edges of the stack. A duct member 12 has a knife-shaped portion which can be forced between the sheets of the stack prior to lowering the pressure member. After the edges and marginal portions of the stack are clamped by member 10, hydraulic pressure is applied through duct member 12 with the effect of inflating the sandwich structure. Simultaneously, the upper press table 9 is gradually raised in accordance with the progressing expansion of the sheet structure. The upper table is stopped and firmly kept in position when the desired thickness of the structure is reached.

Referring now to FIG. 5, it will be recognized that a metal sheet provided with cut-outs of the illustrated type is easily expansible in two directions, denoted by the arrows A—A and B—B, perpendicular to each other. The illustrated sheet has a number of regularly distributed cut-outs 11 of circular shape arranged in a repetitious pattern of squares. Between each four of the circular cut-outs, there is arranged a larger cut-out 13 whose contour is composed essentially of four circles concentric to the respective four circular cut-outs. As a result, the sheet forms a number of curved, approximately sickle-shaped strips 14 of remaining material. The length of each member 14 measured along its curved shape is approximately equal to the straight length which the same member will reach when the sandwich structure is being expanded to its final shape.

The expansibility of the lattice sheet in two directions has important advantages. In the first place, the material is not subjected to excessive elongation during the expansion process and for that reason may consist of ordinary structural steel without impairment of its quality. Secondly, the stress imposed upon the welded spots during stretching of the strut members is kept relatively low as compared with the stress that would result from the expanding and stretching process in originally straight strut members. Finally, the expansible design of the lattice shape also offers the following advantage. The individual "strands" of material of which the strut member may be thought of to be composed are of unequal length; that is, the stress applied to the inner periphery of each strut member 14 according to FIG. 5 acts along a shorter length than the stress occurring on the outer periphery of the same strut member. When such a strut member of non-uniform length is stretched, it does not stay flat but curls or warps. As a result, the finished three-dimensional strut structure will support a higher load than can be supported by a flat strut member.

Another means for stabilizing or bracing the strut member in its final length and direction can be obtained by providing a bridge as shown at 15 in FIG. 5. This bridge, extending across the circular cut-outs 16, interconnects two adjacent strut members 14 in an asymmetrical way. During stretching, occurring when the structure is being expanded, the bridge 15 collapses and the reacting forces imposed upon the two adjacent strut members 14 force them into an angular position relative to each other. This twisting effect of the asymmetrical bridges, together with the combined effect caused by the non-uniform length of the curved strut members, results in a particularly rigid structure highly resistant in all directions of the completed hollow sheet metal product.

Smooth surfaces of the finished products are secured by conducting the final inflating of the structure at a high pressure and maintaining a continuous balance between the inner pressure acting upon the press table 9 and the pressure acting upon the outer press member 10 during the entire expansion process. A high pressure rate also contributes to reducing the tension imposed upon the welded spots due to the stress acting on the strut members. That is, by increasing the pressure exerted by the press upon the welded spots, the adhesive force required at these spots is reduced.

The described process can be readily performed automatically in the following steps:

*Step 1.*—Perforation of the lattice sheet by punching.

*Step 2.*—Sandwiching the lattice sheet between the plane cover sheets.

*Step 3.*—Joining the sheets by spot-welding.

*Step 4.*—Expanding the structure by inflation in a table press.

The expansion due to fluid pressure may be performed with the sheets in heated condition. However, no heating of the sheets is needed when employing hydraulic pressure.

As mentioned above, the welded joints are preferably produced by the coaxial welding electrodes which supply both polarities of the welding current from the same side of the work piece. When operating with alternating current, the highest density occurs near the outer periphery of a ring-shaped welding area which is desired for good welding. The lifting forces between electrodes and work piece occurring at high current intensities can be compensated by designing the electrodes as solenoids or providing them with such compensating solenoids. In FIG. 5, the location of the just-mentioned ring-shaped welds is indicated by broken lines denoted by 12.

Figure 7:
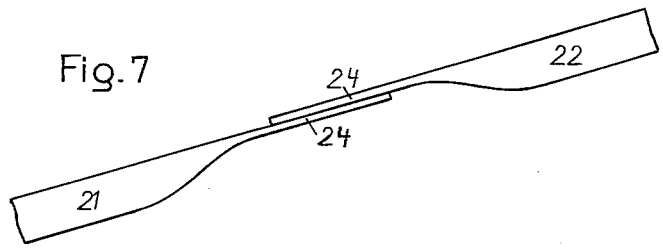
FIGS. 7 and 10 show schematically a number of different junctions formed between sheet metal structures according to the invention as applicable for the construction of roofs, flooring and walls or similar purposes.

FIG. 7 shows an example of a junction between two hollow sheet metal structures 21 and 22 each designed and manufactured in accordance with the present invention as described above. The flat marginal portions 24 of the two structures are placed one upon the other and can be joined by welding, riveting or by screws or any other conventional fastening means.

Figure 8:
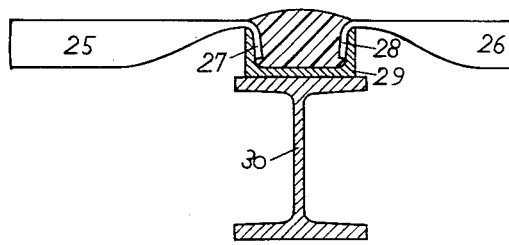

According to FIG. 8, two sheet metal structures 25 and 26 according to the invention have their respective marginal portions 27 and 28 bent to an approximately right angle and joined with a U-beam 29 mounted upon an H-beam 30. This particular type of junction is applicable, for instance, in floor or roof constructions.

Figure 10:
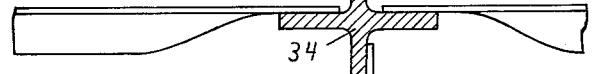
Figure 9:
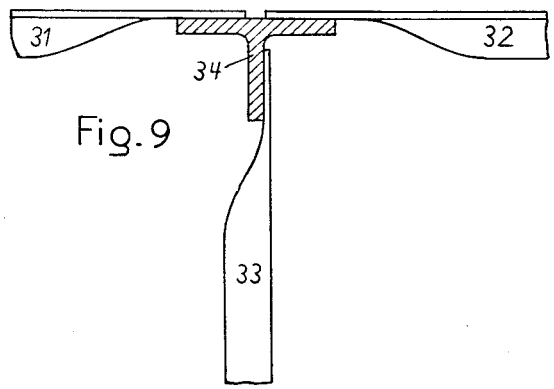

An analogous way of joining three hollow sheet metal structures 31, 32, 33, according to the invention, with a T-beam 34 is shown in FIG. 9. FIG. 10 illustrates a corresponding junction of four sheet metal structures according to the invention with an X-shaped beam 34.

It will be obvious to those skilled in the art, upon a study of this disclosure, that my invention is applicable not only to steel but also to other metals and alloys such as aluminum or light-metal alloys, and that the invention, in some of its aspects, is not limited to the particular joining or welding methods described herein and, furthermore, that the design of the lattice sheet, the manufacturing equipment and various other features may be modified without departing from the essential essence of the invention and within the scope of the claims annexed hereto.

I claim:

1. The method of producing hollow rigid sheet metal structures from at least three planar metal sheets, which comprises sandwiching between two continuous cover sheets a lattice sheet having an area pattern of lattice-forming perforations each covering an area of substantially equal width and length, locally welding said lattice sheet to one of said cover sheets at a multitude of mutually spaced and areally distributed points, locally welding said lattice sheet to the other cover sheet at another multitude of interspersed points, sealing the edges of the flat sandwich assembly, and supplying pressure fluid into the sealed interspaces to expand the sandwich assembly and permanently deform said lattice sheet into a rigid three-dimensional spacer structure formed by the lattice-sheet material located between the perforations.

2. In the method according to claim 1, the step of performing said local welding of said lattice sheet to said respective cover sheets by applying concentric welding electrodes of respectively different electric polarities from the outside against the one cover sheet to be welded, and heat-insulating the other cover sheet at the welding locations of said one cover sheet whereby the welding depth is limited to said lattice sheet.

3. The method of producing hollow rigid sheet metal structures from at least three planar metal sheets, which comprises sandwiching between two continuous cover sheets, a lattice sheet having an area pattern of lattice-forming perforations each covering an area of substantially equal width and length, locally welding said lattice sheet to one of said cover sheets at a multitude of mutually spaced and areally distributed points, locally welding said lattice sheet to the other cover sheet at another multitude of interspersed points, sealing the edges of the flat sandwich assembly, supplying liquid under pressure into the interior of the sandwich assembly to thereby inflate the assembly and permanently deform said lattice sheet into a rigid spacer structure formed by the lattice-sheet material located between the perforations and thereafter removing the liquid.

4. The method of producing hollow rigid sheet metal structures from at least three planar metal sheets, which comprises punching an area pattern of curved-contour perforations into one of said sheets so as to leave regularly distributed imperforate portions joined with one another by curved strut portions, sandwiching the perforated sheet between two continuous cover sheets, permanently joining one cover sheet to said perforated sheet at a regularly distributed number of said imperforate portions, and permanently joining the other cover sheet to said perforated sheet at another, interspersed number of said imperforate locations, sealing the edges of the sandwich assembly, and applying fluid pressure to its interior so as to inflate said assembly and permanently deform said curved strut portions to rigid spacer struts.

References Cited in the file of this patent

UNITED STATES PATENTS

| | | |
|---|---|---|
| 1,047,766 | Dickel | Dec. 17, 1912 |
| 1,709,865 | Muffly | Apr. 23, 1929 |
| 1,779,911 | Litle | Oct. 28, 1930 |
| 1,933,253 | Gersman | Oct. 31, 1933 |
| 1,974,665 | Schnetzer et al. | Sept. 25, 1934 |
| 2,212,481 | Sendzimir | Aug. 20, 1940 |
| 2,481,046 | Scurlock | Sept. 6, 1949 |
| 2,746,139 | Van Pappelendam | May 22, 1956 |
| 2,747,064 | Van Pappelendam | May 22, 1956 |
| 2,756,496 | Holland | July 31, 1956 |
| 2,759,246 | Campbell | Aug. 21, 1956 |
| 2,766,514 | Adams | Oct. 16, 1956 |
| 2,779,086 | Rieppel | Jan. 29, 1957 |